United States Patent [19]

Fujita et al.

[11] Patent Number: 5,286,099
[45] Date of Patent: Feb. 15, 1994

[54] COLLISION PREVENTING SYSTEM FOR VEHICLE

[75] Inventors: Yasuhiko Fujita; Toshiaki Arai; Makoto Sato, all of Wako, Japan

[73] Assignee: Honda Giken Kogyo Kabushiki Kaisha, Tokyo, Japan

[21] Appl. No.: 892,827

[22] Filed: Jun. 5, 1992

[30] Foreign Application Priority Data

Jun. 7, 1991 [JP] Japan .................. 3-136570
Jun. 7, 1991 [JP] Japan .................. 3-136571

[51] Int. Cl.$^5$ ............................. B60T 8/86
[52] U.S. Cl. ............................. 303/103; 180/271
[58] Field of Search ............ 180/271, 275; 303/95, 303/96, 103, 111, 100; 364/426.02

[56] References Cited

U.S. PATENT DOCUMENTS

| | | | |
|---|---|---|---|
| 3,950,036 | 4/1976 | Fink et al. | 303/111 |
| 4,048,613 | 9/1977 | Ito et al. | 180/271 X |
| 4,095,666 | 6/1978 | Baba et al. | 303/100 X |
| 4,308,536 | 12/1981 | Sims, Jr. et al. | 342/70 |
| 4,855,917 | 8/1989 | Sawano et al. | 303/103 X |
| 4,896,924 | 1/1990 | Kuwana et al. | 303/103 X |
| 4,934,477 | 6/1990 | Dai | 180/271 |
| 4,966,248 | 10/1990 | Farr | 303/103 X |
| 4,979,784 | 12/1990 | Arikawa | 303/111 |
| 5,011,235 | 4/1991 | Arikawa | 303/111 X |
| 5,028,095 | 7/1991 | Okubo | 303/103 X |
| 5,173,859 | 12/1992 | Deering | 180/271 X |

FOREIGN PATENT DOCUMENTS 2824015 12/1979 Fed. Rep. of Germany ...... 180/275
1546906 5/1979 United Kingdom .
2136899 9/1984 United Kingdom .

Primary Examiner—Robert J. Oberleitner
Assistant Examiner—Alfred Muratori
Attorney, Agent, or Firm—Armstrong, Westerman, Hattori, McLeland & Naughton

[57] ABSTRACT

A collision preventing system for vehicles comprising a road surface friction coefficient judgement circuit for judging a friction coefficient of a travel road surface on the basis of a detection value detected by a wheel speed detector, and for outputting a judgement signal, when determination is made that the friction coefficient is equal to or less than a predetermined value, a first comparator adapted to deliver a first brake control signal indicative of a command to continuously operate each brake when there is a high possibility of collision, a second comparator adapted to deliver a second brake control signal indicative of a command to perform a pumping braking when there is a lower possibility of collision than that of the first brake control signal, and a changing-signal outputting circuit for outputting a changing-signal indicative of a command to change the operation control mode for each brake in response to the delivery of the judgement signal from the road surface friction coefficient judgement circuit when the second brake control signal is delivered form the second comparator. With this arrangement, it is possible to conduct the pumping braking at a stage prior to the full braking, and to obtain an appropriate braking force in accordance with the friction coefficient which is determined during the pumping braking. This avoids conveyance of a vague braking feeling to a driver.

3 Claims, 8 Drawing Sheets

COLLISION PREVENTING SYSTEM FOR VEHICLE

BACKGROUND OF THE INVENTION

1. Field of the Invention

This invention relates to a collision preventing system for vehicles, including a detector for detecting an operational parameter between a subject vehicle and a contrast obstruction for judging the possibility of collision of the subject vehicle against the contrast obstruction, so that a brake is operated on the basis of a detection value detected by the detector.

2. Description of the Prior Art

Such collision preventing systems are conventionally well-known, for example, from Japanese Patent Publication No. 4700/86.

In the above prior art systems, each of the brakes is automatically operated when there has arisen a possibility of collision of the subject vehicle against a contrast obstruction, e.g., against a vehicle in front. However, the friction coefficient of the road surface is not taken into consideration and for this reason, a desired reduction in speed cannot be obtained on a road surface having a low friction coefficient, such as a snowy road or an iced road, even if full braking is applied. In addition, a vehicle driver cannot feel or sense automatic braking beforehand and, therefore, if such automatic braking is suddenly applied so as to avoid a collision, it imparts to the driver an impermissible braking feeling.

SUMMARY OF THE INVENTION

Accordingly, it is an object of the present invention to provide a collision preventing system for a vehicle, in which a pumping of the brakes is conducted at a stage prior to full braking in order to judge a friction coefficient of the road surface from a behavior of a wheel subjected to the pumping of the brakes, thereby enabling braking corresponding to the friction coefficient of road surface to cause an appropriate reduction in speed, while avoiding conveyance to the driver of an impermissible braking feeling.

To achieve the above object, according to the present invention, there is provided a collision preventing system for vehicles, including a detector for detecting an operational parameter between a subject vehicle and a contrast obstruction for judging a possibility of collision of the subject vehicle against the contrast obstruction, the brakes being operated on the basis of a detection value detected by the detector. The system comprises a road surface friction coefficient judgement circuit for judging a friction coefficient of a travel road surface on the basis of a detection value detected by a wheel speed detector which detects a speed of each of the wheels, and for outputting a judgement signal, when determination is made that the friction coefficient is equal to or less than a predetermined value; a first comparator for comparing the detection value of the detector with a first reference value indicative of a high possibility of collision of the subject vehicle against the contrast obstruction and for outputting, on the basis of the result of such comparison, a first brake control signal indicative of a command to continuously operate each brake; a second comparator for comparing the detection value of the detector with a second reference value indicative of a possibility of the collision lower than that in the case of the first reference value, and for outputting, on the basis of the result of such second comparison, a second brake control signal indicative of a command to perform a pumping operation for each brake; and a changing-signal output circuit for outputting a changing-signal indicative of a command to change an operation control mode for each brake in response to the judgement signal outputted from the road surface friction coefficient judgement circuit in a condition in which the second brake control signal is outputted from the second comparator.

With such arrangement, the brake pumping can be conducted at the stage prior to full braking to judge the friction coefficient of the road surface from the behavior of the wheel subjected to the pumping braking, thereby enabling a braking force corresponding to the friction coefficient of the road surface to cause an appropriate reduction in speed, while avoiding conveyance to the driver of an impermissible braking feeling.

The above and other objects, features and advantages of the invention will become apparent from a consideration of the following description of the preferred embodiments, taken in conjunction with the accompanying drawings.

BRIEF DESCRIPTION OF THE DRAWINGS

FIGS. 1 to 7 illustrate a first embodiment of the present invention, wherein:

FIG. 1 is a diagram of a braking hydraulic pressure system in a vehicle to which the present embodiment is applied;

FIG. 2 is a longitudinal sectional side view of an electrically-operated hydraulic pressure producing means;

FIG. 3 is a longitudinal sectional view of a fail-safe solenoid switchover valve;

FIG. 4 is a block diagram illustrating a schematic arrangement of an electronic control unit;

FIG. 5 is a block diagram illustrating a schematic arrangement of an automatic brake control circuit;

FIG. 6 is a block diagram illustrating a modification of an essential portion of a trouble diagnosis circuit;

FIG. 7 is a flow chart illustrating a control procedure when the automatic brake control circuit comprises a computer.

DESCRIPTION OF THE PREFERRED EMBODIMENTS

Figure 1:
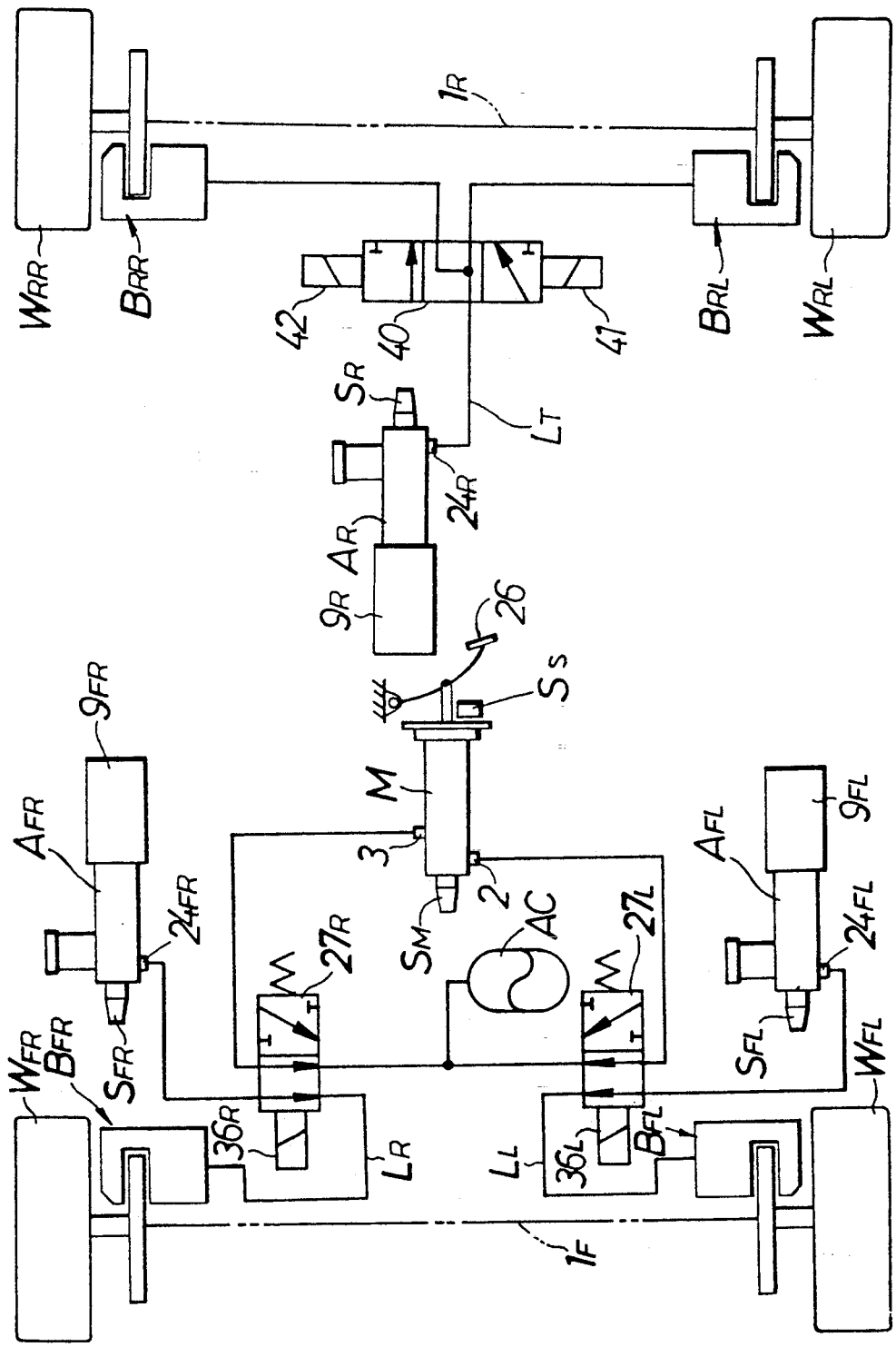

Referring first to FIG. 1 illustrating a first embodiment, a left front wheel disk brake $B_{FL}$ and a right front wheel disk brake $B_{FR}$ are mounted on a left front wheel $W_{FL}$ and a right front wheel $W_{FR}$ on opposite sides of a front axle $1_F$ of an automobile vehicle, respectively, and a left rear wheel disk brake $B_{RL}$ and a right rear wheel disk brake $B_{RR}$ are mounted on a left rear wheel $W_{RL}$ and a right rear wheel $W_{RR}$ on opposite sides of a rear axle $1_R$ of the vehicle, respectively. A brake device in the vehicle comprises a left hydraulic pressure system $L_L$, a right hydraulic pressure system $L_R$ and a collective hydraulic pressure system $L_T$. The left hydraulic pressure system $L_L$ is comprised of left front wheel electrically-operated hydraulic pressure producing means AFL and a first output port 2 in a tandem type master cylinder M, which are switchably connected to the left front wheel disk brake $B_{FL}$, and the right hydraulic pressure system $L_R$ is comprised of right front wheel electrically-operated hydraulic pressure producing means AFR and a second output port 3 in the tandem type master cylinder M, which are switchably connected to the right front wheel disk brake $B_{FR}$. The collective hydraulic pressure system $L_T$ is comprised of a rear wheel electrically-operated hydraulic pressure producing means AR connected to the left and right rear wheel disk brakes $B_{RL}$ and $B_{RR}$.

Figure 2:
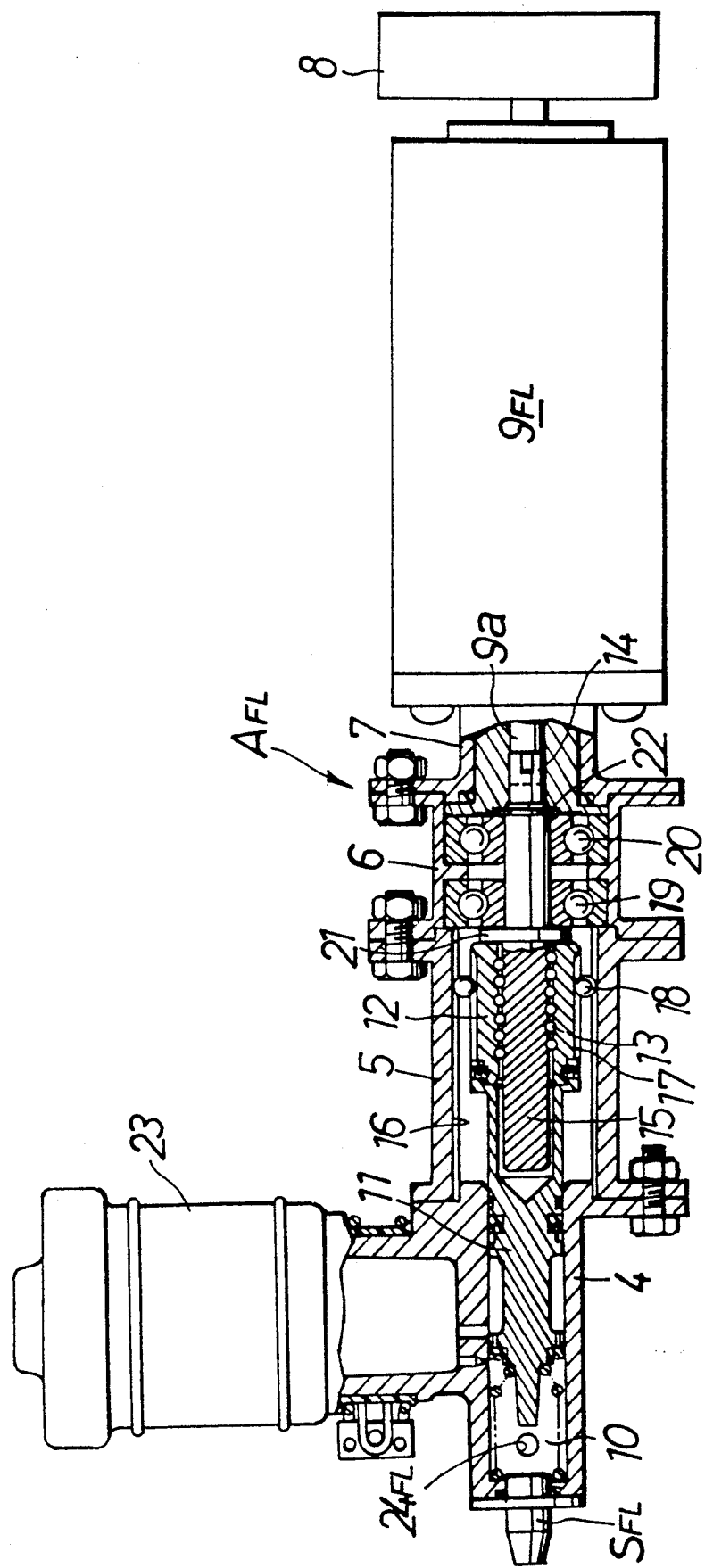

Referring to FIG. 2, the left front wheel electrically-operated hydraulic pressure producing means $A_{FL}$ comprises a cylinder 4 formed into a bottom cylindrical shape with its tip end closed, a cylindrical guide 5 coaxially connected to a rear end of the cylinder 4, a cylindrical support 6 coaxially connected to the cylindrical guide 5, a cylindrical connecting member 7 coaxially connected to the cylindrical support 6, a motor $9_{FL}$ having an encoder 8 and coaxially connected to the cylindrical connecting member 7, a piston 11 slidably received in the cylinder 4 to define a pressure chamber 10 between the piston 11 and the closed end of the cylinder 4, a cylindrical nut member 12 disposed within the cylindrical guide 5 for inhibited rotation about an axis and coaxially connected to a rear end of the piston 11, and a rotary shaft 15 coupled to the nut member 12 through a ball screw 13 and connected to an output shaft 9a of the motor $9_{FL}$ through Oldham's joint 14.

A plurality of axially extending grooves 16 and 17 are provided in a corresponding relation in an inner surface of the cylindrical guide 5 and in an outer surface of the nut member 12, respectively, so that the rotational operation of the nut member 12 and, thus, of the piston 11 about its axis is inhibited by fitting of a ball 18 onto the mutually corresponding grooves 16 and 17. The rotary shaft 15 is rotatably carried in the cylindrical support 6 with a pair of ball bearings 19 and 20 interposed therebetween, so that the axial movement of the rotary shaft 15 is inhibited by engagement of a collar 21 provided on the rotary shaft 15 to project radially outwardly as well as a retaining ring 22 fitted over the rotary shaft 15 with an axially outer end of inner races of the ball bearings 20 and 21.

A reservoir 23 is provided above the cylinder 4, so that a working fluid can be supplied to the pressure chamber 10 and returned from the pressure chamber 10 to the reservoir 23. Further, an output port $24_{FL}$ is provided in the cylinder 4 to lead to the pressure chamber 10 and is connected to the left hydraulic pressure system $L_L$. Moreover, a left front wheel pressure sensor $S_{FL}$ is mounted to the closed end of the cylinder 4 for detecting the hydraulic pressure in the pressure chamber 10, i.e., the braking pressure of the left front wheel disk brake $B_{FL}$ in a condition in which the output port $24_{FL}$ is in communication with the left front wheel disk brake $B_{FL}$.

In such left front wheel electrically-operated hydraulic pressure producing means $A_{FL}$, the piston 11 is axially reciprocally operated by means of the ball screw 13 in response to the normal and reverse rotations of the motor $9_{FL}$, so that a corresponding hydraulic pressure is developed in the pressure chamber 10.

The right front wheel electrically-operated hydraulic pressure producing means $A_{FR}$ and the rear wheel electrically-operated hydraulic pressure producing means $A_R$ have basically the same construction as the left front wheel electrically-operated hydraulic pressure producing means $A_{FL}$ and hence, the detailed description thereof is omitted. Briefly, in the right front wheel electrically-operated hydraulic pressure producing means $A_{FR}$, a hydraulic pressure corresponding to the amount of rotation of the motor $9_{FR}$ is delivered through the output port $24_{FR}$ and detected by the right front wheel pressure sensor $S_{FR}$. In the rear wheel electrically-operated hydraulic pressure producing means $A_R$, a hydraulic pressure corresponding the amount of rotation of the motor $9_R$ is delivered through the output port $24_R$ and detected by the rear wheel pressure sensor $S_R$.

Referring again to FIG. 1, the tandem type master cylinder M is of a conventionally well-known type which delivers a hydraulic pressure corresponding to the amount of operation of a brake pedal 26 through the first and second output ports 2 and 3. The tandem type master cylinder 26 is provided with a stroke sensor $S_s$ for detecting a pedal stroke of the brake pedal 26, and a pressure sensor $S_M$ for detecting an output hydraulic pressure from the first output port 2 corresponding to a depression force on the brake pedal 26.

A fail-safe solenoid switchover valve $27_L$ is provided in the left hydraulic pressure system $L_L$ and is shiftable between modes: a mode in which upon energization of a solenoid $36_L$, the output port $24_{FL}$ in the left front wheel electrically-operated hydraulic pressure producing means $A_{FL}$ is put into communication with the left front wheel disk brake $B_{FL}$, and the first output port 2 in the master cylinder M is put into communication with an accumulator AC, and a mode in which upon deenergization of the solenoid $36_L$, the communication between the output port $24_{FL}$ in the left front wheel electrically-operated hydraulic pressure producing means $A_{FL}$ and the left front wheel disk brake $B_{FL}$ is cut off, and the first output port 2 in the master cylinder M is put into communication with the left front wheel disk brake $B_{FL}$.

Figure 3:
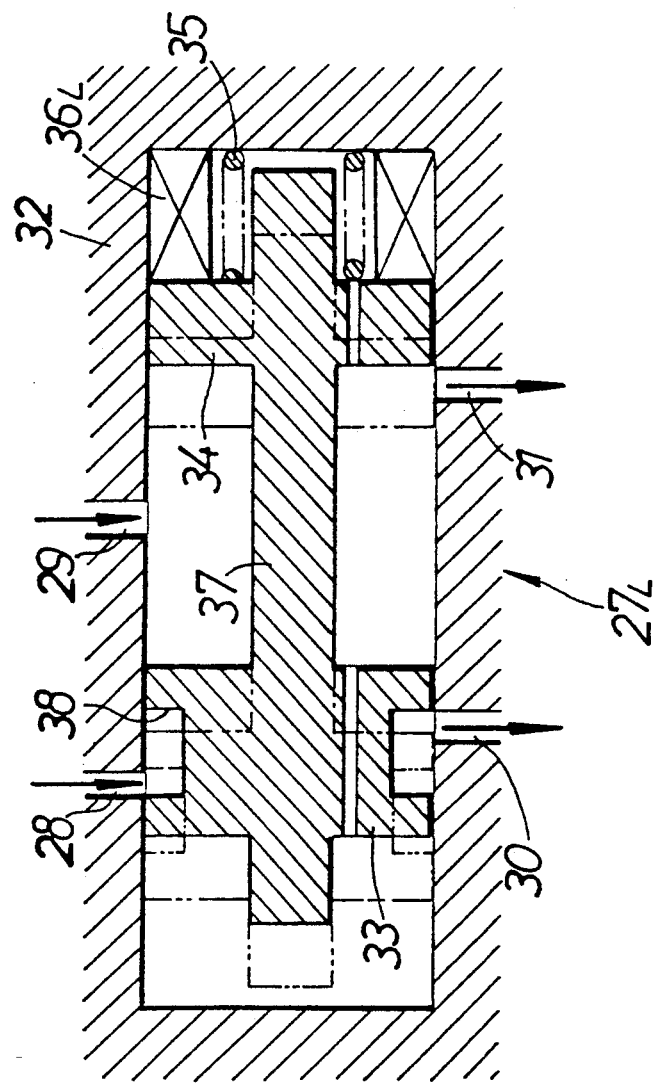

Referring to FIG. 3, the fail-safe solenoid switchover valve $27_L$ comprises a housing 32 which has a first input port 28 leading to the output port $24_{FL}$ in the left front wheel electrically-operated hydraulic pressure producing means $A_{FL}$, a second input port 29 leading to the first input output port 2 in the master cylinder M, a first output port 30 leading to the left front wheel disk brake $B_{FL}$, and a second output port 31 leading to the accumulator AC; first and second disk-shaped valve members 33 and 34 coaxially and operatively connected to each other and slidable in the housing 32; a return spring 35 interposed between the second valve member 34 and the housing 32 to exhibit a spring force for biasing both the valve members 33 and 34 in one of axial directions; and the solenoid $36_L$ contained in the housing 32 to exhibit an electromagnetic force for attracting both the valve members 33 and 34 in the other axial direction against the spring force of the return spring 35 upon energization thereof.

The first and second valve members 33 and 34 are coaxially connected to a connecting shaft 37. An annular groove 38 is provided in an outer surface of the first valve member 33 always in communication with the first input port 28, so that it can be put into communication with the first output port 30, as shown by a solid line in FIG. 3, upon energization of the solenoid $36_L$, but can be put out of communication with the first output port 30, as shown by a dashed line in FIG. 3, upon deenergization of the solenoid $36_L$. The spacing between the first and second valve members 33 and 34 is set such that upon energization of the solenoid $36_L$, the communication between the second input port 29 and the first output port 30 may be blocked by the first valve member 33, and the second input port 29 and the second output port 31 may be put into communication with each other, as shown by a solid line in FIG. 3, and upon deenergization of the solenoid $36_L$, the communication between the second input port 29 and the second output port 31 may be blocked by the second valve member 34, and the second input port 29 and the first output port 30 may be put into communication with each other, as shown by a dashed line in FIG. 3.

The solenoid $36_L$ of the fail-safe solenoid switchover valve $27_L$ may be energized in response to the start of an engine mounted in the vehicle and is normally in an energized state, so that an output hydraulic pressure from the left front wheel electrically-operated hydraulic pressure producing means $A_{FL}$ can be transmitted to the left front wheel disk brake $B_{FL}$, and an output pressure from the master cylinder M is absorbed by the accumulator AC. When the solenoid $36_L$ is deenergized, the solenoid switchover valve $27_L$ enables the output hydraulic pressure from the master cylinder M to be transmitted to the left front wheel disk brake $B_{FL}$. Thus, when the left front wheel electrically-operated hydraulic pressure producing means $A_{FL}$ gets out of order or has any trouble, the output pressure from the master cylinder M can be applied to the left front wheel disk brake $B_{FL}$ by deenergizing the solenoid $36_L$ of the fail-safe solenoid switchover valve $27_L$, thereby assuring a braking force.

The right hydraulic pressure system $L_R$ is provided with a fail-safe solenoid switchover valve $27_R$ which has basically the same construction as the above-described fail-safe solenoid switchover valve $27_L$. The fail-safe solenoid switchover valve $27_R$ is shiftable between modes: a mode in which upon energization of a solenoid $36_R$, the output port $24_{FR}$ in the right front wheel electrically-operated hydraulic pressure producing means $A_{FR}$ is put into communication with the right front wheel disk brake $B_{FR}$, and the second output port 3 in the master cylinder M is put into communication with the accumulator AC common with the above-described solenoid switchover valve $27_L$, and a mode in which upon deenergization of the solenoid $36_R$, the communication between the output port $24_{FR}$ in the right front wheel electrically-operated hydraulic pressure producing means $A_{FR}$ and the right front disk brake $B_{FR}$ is cut off, and the second output port 3 in the master cylinder M is put into communication with the right front wheel disk brake $B_{FR}$.

A shut-off valve 40 is provided in the collective hydraulic pressure system $L_T$. The shut-off valve 40 is a three-port and three-position solenoid switchover control valve which is shiftable among three positions: a neutral position in which a hydraulic pressure delivered through the output port $24_R$ in the rear wheel electrically-operated hydraulic pressure producing means $A_R$ can be transmitted to the left and right rear wheel disk brakes $B_{RL}$ and $B_{RR}$ upon deenergization of solenoids 41 and 42; a position (an upper position in FIG. 1) in which upon energization of the solenoid 41 while leaving the solenoid 42 deenergized, the output hydraulic pressure from the output port $24_R$ can be transmitted to the left rear wheel disk brake $B_{RL}$, but cut off to the right rear wheel disk brake $B_{RR}$; and a position (a lower position in FIG. 1) in which upon energization of the solenoid 42 while leaving the solenoid 41 deenergized, the output hydraulic pressure from the output port $24_R$ can be transmitted to the right rear wheel disk brake $B_{RR}$, but cut off to the left rear wheel disk brake $B_{RL}$.

Figure 4:
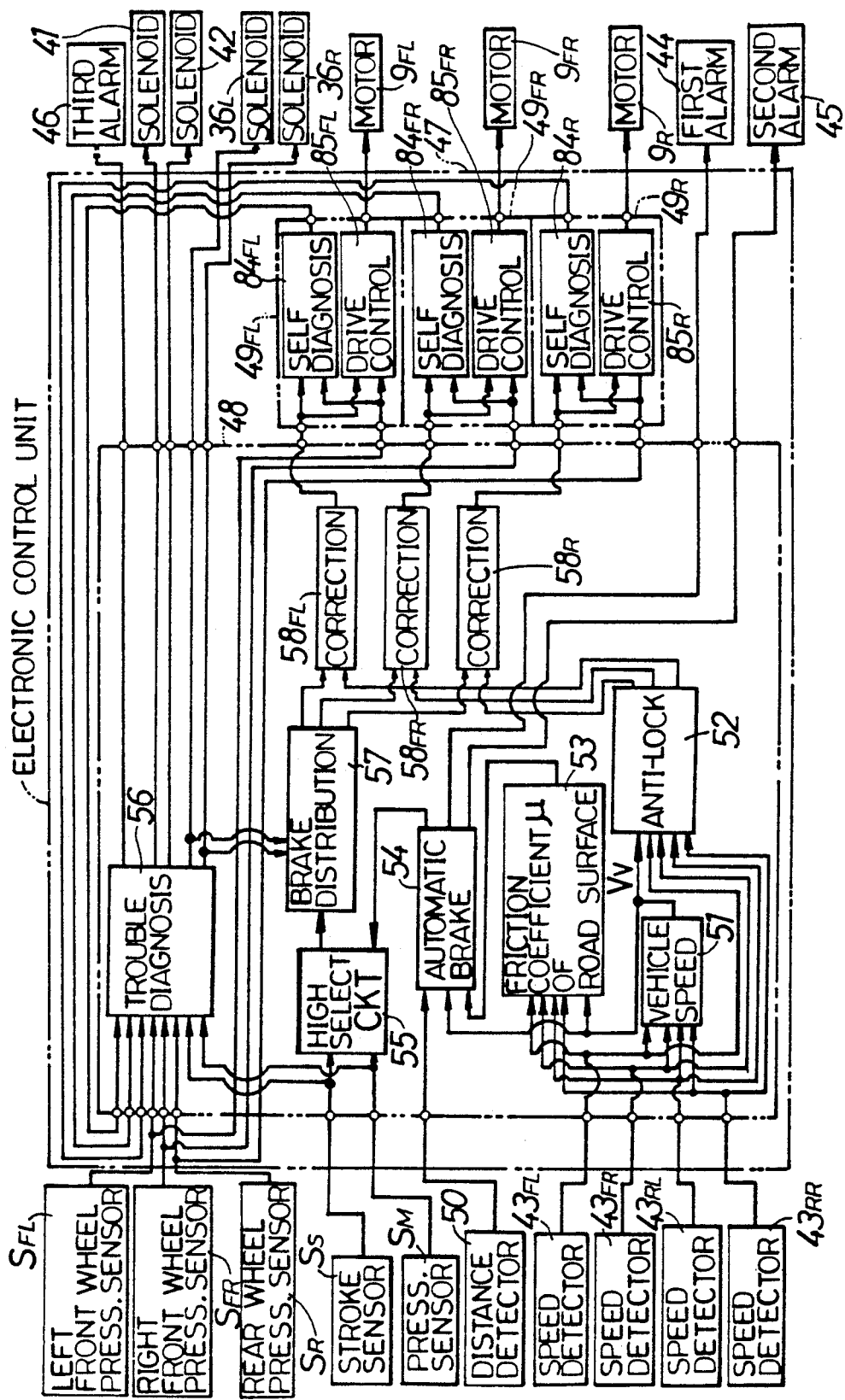

Referring to FIG. 4, the solenoid $36_L$ of the fail-safe solenoid switchover valve $27_L$ in the left hydraulic pressure system $L_L$, the solenoid $36_R$ of the fail-safe solenoid switchover valve $27_R$ in the right hydraulic pressure system $L_R$, the solenoids 41 and 42 of the shut-off valve 40 in the collective hydraulic pressure system $L_T$, the motors $9_{FL}$, $9_{FR}$ and $9_R$ of the electrically-operated hydraulic pressure producing means $A_{FL}$, $A_{FR}$, and $A_R$ and first, second and third alarms 44, 45 and 46 are controlled by an electronic control unit 47 which comprises a primary arithmetic processing section 48 and a subsidiary arithmetic processing sections $49_{FL}$, $49_{FR}$ and $49_R$.

The primary arithmetic processing section 48 comprises a vehicle speed detecting circuit 51, an antilock control circuit 52, a road surface friction coefficient judging circuit 53, an automatic brake control circuit 54, a brake distribution control circuit 57, and three correcting circuits $58_{FL}$, $58_{FR}$ and $58_R$.

The vehicle speed detecting circuit 51 detects a vehicle speed $V_V$ on the basis of detection values obtained in wheel speed detectors $43_{FL}$, $43_{FR}$, $43_{RL}$ and $43_{RR}$ mounted on the left front wheel $W_{FL}$, the right front wheel $W_{FR}$, the left rear wheel $W_{RL}$ and the right rear wheel $W_{RR}$, respectively.

The antilock control circuit 52 is arranged to detect, on the basis of the detection values obtained in wheel speed detectors $43_{FL}$, $43_{FR}$, $43_{RL}$ and $43_{RR}$ as well as the vehicle speed $V_V$ obtained in the vehicle speed detecting circuit 51, whether or not the left and right front wheels $W_{FL}$ and $W_{FR}$ as well as both the rear wheels $W_{RL}$ and $W_{RR}$ are about to become locked, and to output signals indicative of a comment to control the braking pressures of the left and right front wheel disk brakes $B_{FL}$ and $B_{FR}$, as well as both the rear wheel disk brakes $B_{RL}$ and $B_{RR}$, respectively.

The road surface friction coefficient judging circuit 53 is arranged to output a high level signal when determination is made that the friction coefficient $\mu$ of a road surface on which the vehicle is travelling becomes equal to or less than a predetermined friction coefficient of road surface $\mu_0$, e.g., 0.4. The detection values obtained in wheel speed detectors $43_{FL}$, $43_{FR}$, $43_{RL}$ and $43_{RR}$ as well as the vehicle speed $V_V$ obtained in the vehicle speed detecting circuit 51 are received into the road surface friction coefficient judging circuit 53. In the road surface friction coefficient judging circuit 53, the detection values obtained in the wheel speed detectors $43_{FL}$, $43_{FR}$, $43_{RL}$ and $43_{RR}$ are compared with a reference wheel speed provided by taking account of a predetermined slip rate into the vehicle speed $V_V$, and when at least one of the detection values obtained in the wheel speed detectors $43_{FL}$, $43_{FR}$, $43_{RL}$ and $43_{RR}$ has become equal to or less than the reference wheel speed, the high level signal is delivered from the road surface friction coefficient judging circuit 53 on the basis of the decision of the fact that the friction coefficient $\mu$ has become equal to or less than a predetermined friction coefficient $\mu_0$.

The automatic brake control circuit 54 is arranged so that whether or not the disk brakes $B_{FL}$, $B_{FR}$, $B_{RL}$ and $B_{RR}$ should be automatically operated is judged on the basis of the vehicle speed $V_V$ obtained in the vehicle speed detecting circuit 51 and a distance L obtained in a distance detector 50 such as a laser for detecting a distance as an operational parameter between the subject vehicle and a contrast obstruction, e.g., another vehicle which is travelling ahead of the subject vehicle, and in accordance with the result of judgement, the following signals are stepwise outputted: (1) a signal indicative of a command to previously notify a driver of the start of an automatic braking operation, (2) a signal indicative of a command to notify a vehicle in rear of the start of the automatic braking operation and provide a pumping operation of each of the disk brakes $B_{FL}$, $B_{FR}$, $B_{RL}$ and $B_{RR}$, and (3) a signal indicative of a command to provide a full operation of each of the disk brakes $B_{FL}$, $B_{FR}$, $B_{RL}$ and $B_{RR}$, and when a high level judgement signal is received into the brake circuit 54 from the road surface friction coefficient judging circuit 53 during pumping operation of each of the disk brakes $B_{FL}$, $B_{FR}$, $B_{RL}$ and $B_{RR}$, the output signal is changed over to the signal indicative of a command to provide the full operation of each of the disk brakes $B_{FL}$, $B_{FR}$, $B_{RL}$ and $B_{RR}$.

Figure 5:
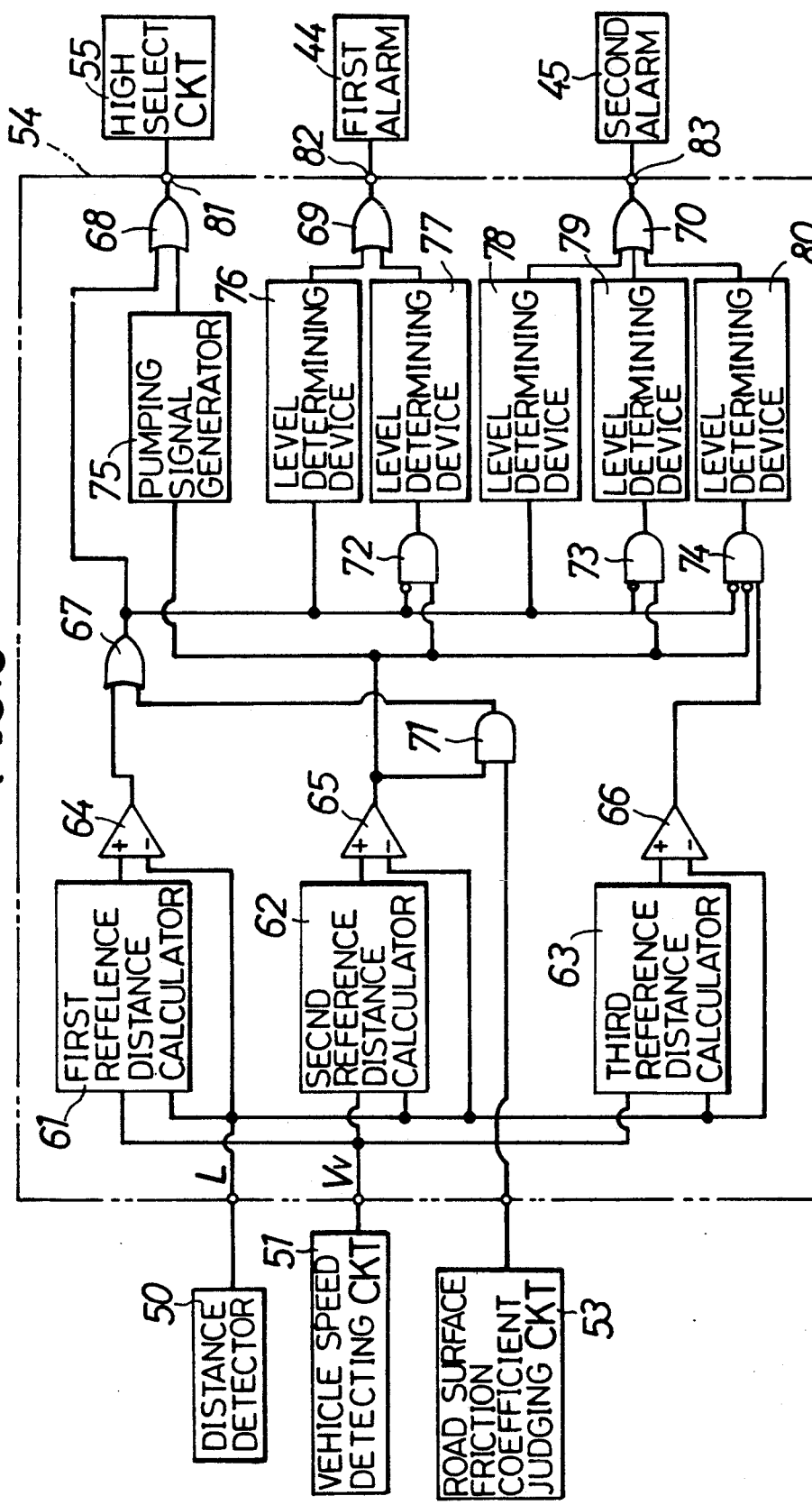

The automatic brake control circuit 54 is arranged as shown in FIG. 5 and comprises first, second and third reference distance calculators 61, 62 and 63, first, second and third comparators 64, 65 and 66, OR gates 67, 68, 69 and 70 AND gates 71, 72, 73 and 74, a pumping-signal output device 75, and first, second, third, fourth and fifth level determining devices 76, 77, 78, 79 and 80.

The first, second and third reference distance calculators 61, 62 and 63 calculate a reference distance $L_R$ basically according to the following expression (1) on the basis of the vehicle speed $V_V$ obtained in the vehicle speed detecting circuit 51 and the distance L obtained in the distance detector 50:

$$L_R = V_V(T_D + T_X) + (V_V^2 - V_B^2) / (2\alpha) \cdot (1)$$

wherein $T_D$ is set as a time until each of the actuators, i.e., the electrically-operated hydraulic pressure producing means $A_{FL}$, $A_{FR}$ and $A_R$ as well as the first and second alarms 44 and 45 start their operations in response to the delivery of the signal from the automatic brake control circuit 54; $T_x$ is set as a time required from the reception of a signal into the automatic brake control circuit 54 to the delivery of a signal from the automatic brake control circuit 54; $\alpha$ is a set deceleration of the vehicle; and $V_B$ is a travel speed of an obstruction, e.g., a vehicle travelling in front, to which the distance L from the subject vehicle is detected in the distance detector 50, and is a value calculated according to the following expression:

$$V_B = V_V + dL/dt \quad (2)$$

$V_V^2 - V_B^2) / (2\alpha))$ indicates a difference in braking distance between the subject vehicle and a contrast obstruction, i.e., a vehicle in front thereof. In addition $(V_V \cdot T_D)$ is a distance through which the vehicle travels until the electrically-operated hydraulic pressure producing means $A_{FL}$, $A_{FR}$ and $A_R$, as well as the first and second alarms 44 and 45, start their operations in response to the delivery of the signal from the automatic brake control circuit 54, and $(V_V \cdot T_x)$ is a distance through which the vehicle travels while it is judged whether or not an operation for avoiding the collision should be conducted in the automatic brake control circuit 54.

The set deceleration $\alpha$ is set at different values in the reference distance calculators 61, 62 and 63, respectively. A first reference distance $L_{R1}$ depending upon a set deceleration $\alpha_1$ is obtained in the first reference distance calculator 61; a second reference distance $L_{R2}$ depending upon a set deceleration $\alpha_2$ is obtained in the second reference distance calculator 62, and a third reference distance $L_{R3}$ depending upon a set deceleration $\alpha_3$ is obtained in the third reference distance calculator 63. Moreover, the set decelerations $\alpha_1$, $\alpha_2$ and $\alpha_3$ are set such that a relation $\alpha_1 > \alpha_2 > \alpha_3$ is established, and the first to third reference distances are set such that a relation $L_{R1} < L_{R2} < L_{R3}$ is established.

The first reference distance $L_{R1}$ calculated in the first reference distance calculator 61 is applied to a non-inverted input terminal of the first comparator 64, and the distance L obtained in the distance detector 50 is applied to an inverted input terminal of the first comparator 64. The second reference distance $L_{R2}$ calculated in the second reference distance calculator 62 is applied to a non-inverted input terminal of the second comparator 65, and the distance L obtained in the distance detector 50 is applied to an inverted input terminal of the second comparator 65. Further, the third reference distance $L_{R3}$ calculated in the third reference distance calculator 63 is applied to a non-inverted input terminal of the third comparator 66, and the distance L is obtained in the distance detector 50 is applied to an inverted input terminal of the third comparator 66. Thus, in the course where the distance L obtained in the distance detector 50 is becoming small, the third comparator 66 first outputs a third brake control signal which is of a high level; then, the second comparator 65 outputs a second brake control signal which is of a high level, and finally, the first comparator 64 outputs a first brake control signal which is of a high level.

The output signal from the first comparator 64 and an output signal from the AND gate 71 as a changing-signal outputting circuit are received in parallel into the OR gate 67. Thus, the OR gate 67 outputs a high level signal at least either when the distance L becomes less than the first reference distance $L_{R1}$ calculated in the first reference distance calculator 61, or when the output from the AND gate 71 becomes a high level. Moreover, the output signal from the second comparator 65 and an output signal from the road surface friction coefficient judging circuit 53 are received in parallel into the AND gate 71 which outputs a high level changing-signal when the distance L becomes less than the second reference distance $L_{R2}$ calculated in the second reference distance calculator 62 and the friction coefficient $\mu$ of a travel road becomes equal to or less than the predetermined road surface friction coefficient $\mu_0$.

The pumping-signal output device 75 outputs an intermittent high level signal in response to the output signal from the second comparator 65 becoming a high level, i.e., the distance L becoming less than the second reference distance $L_{R2}$ calculated in the second reference distance calculator 62. This output signal from the pumping-signal output device 75 and the output signal from the OR gate 67 are received into the OR gate 68. Thus, the OR gate 68 delivers a continuous high level full-braking command signal, when at least one of the following two requirements has been established, that is, of a requirement that the distance L is less than the first reference distance $L_{R1}$ and a requirement that the distance L is less than the second reference distance $L_{R2}$ and the friction coefficient $\mu$ of a travel road surface is equal to or less than the predetermined road surface friction coefficient $\mu_0$. However, if none of these requirements is established and when the distance L is less than the second reference distance $L_{R2}$, the OR gate 68 delivers an intermittent high level pumping-brake command signal. An output terminal 81 connected to the OR gate 68 is connected to a high select circuit 55 shown in FIG. 4.

Output signals from the first and second level determining devices 76 and 77 are connected in parallel to the OR gate 69. The first level determining devices 76 outputs an alarm command signal of a predetermined high level, when the output signal from the OR gate 67 becomes a high level. The second level determining devices 77 outputs an alarm command signal of a level lower than that of the output signal from the first level determining devices 76 in response to a high level signal received thereinto from the AND gate 72. The output signal from the OR gate 67 is received in an inverted manner into the AND gate 72, and the output signal from the second comparator 65 is also received into the AND gate 72. Thus, the AND gate 72 delivers a high level signal, when the pumping-braking command signal has been outputted from the output terminal 81, and in response thereto, the second level determining device 77 outputs an alarm signal.

An output terminal 82, to which the OR gate 69 is connected, is connected to the first alarm 44. The first alarm 44 is an alarm such as a lamp which is operated to give an alarm toward a vehicle in rear. When the pumping-brake command signal is delivered from the output terminal 81, the first alarm 44 performs an alarming operation of a low level. On the other hand, when the full-brake command signal is delivered from the output terminal 81, the first alarm 44 performs an alarming operation of a high level.

Output signals from the third, fourth, and fifth level determining devices 78, 79 and 80 are received in parallel into the OR gate 70. The third level determining device 78 outputs an alarm command signal of a predetermined level, when the signal from the OR gate 67 becomes a high level. The fourth level determining device 79 outputs an alarm command signal of a level lower than that of the output signal from the third level determining device 78 in response to the high level signal from the AND gate 73 received thereinto. The output signal from the OR gate 67 is received in an inverted manner into the AND gate 73, and the output signal from the second comparator 65 is also received into the AND gate 73 received thereinto. Thus, the AND gate 73 outputs a high level signal, when the pumping-brake command signal is delivered from the output terminal 81. Further, the fifth level determining from the output terminal 81. Further, the fifth level determining device 80 outputs an alarm command signal of a level lower than that of the output signal from the fourth level determining device 79 in response to the high level signal received thereinto from the AND gate 74. The output signals from the OR gate 67 and the second comparator 65 are received in an inverted manner into the AND gate 74, and the output signal from the third comparator 66 is also received into the AND gate 74. Thus, the AND gate 74 outputs a high level signal, when the output signal from the output terminal 81 is of a low level and the output signal from the output terminal 82 is of a low level, and moreover, the output signal from the third comparator 66 is of a high level.

An output terminal 83, to which the OR gate 70 is connected, is connected to the second alarm 45. This second alarm such as a buzzer which is operated to give an alarm toward the driver. When the distance L is equal to or more than the first and second reference distance $L_{R1}$ and $L_{R2}$ and less than the third reference distance $L_{R3}$, the second alarm 45 performs an alarming operation of a low level. When the pumping-brake command signal is delivered from the output terminal 81 in a condition in which the distance L is equal to or more than the first reference distance $L_{R1}$ and less than the second reference distance $L_{R2}$, the second alarm 45 performs an alarming operation of a mean level. When the full-brake command signal is delivered from the output terminal 81 in a condition in which the distance L is less than the first reference distance $L_{R1}$, or in a condition in which the distance L is less than the second reference distance $L_{R2}$, but the friction coefficient $\mu$ of road surface is equal to or less than the predetermined friction coefficient $\mu_0$ of road surface, the second alarm device 45 performs an alarming operation of a high level.

Referring again to FIG. 4, the stroke sensor $S_S$ and the pressure sensor $S_M$ associated with the master cylinder M and the output terminal 81 (see FIG. 5) in the automatic brake control circuit 54 are connected to the high select circuit 55 in parallel. The high select circuit 55 selects one of the stroke sensor $S_S$, the pressure sensor $S_M$ and the automatic brake control circuit 54 which is at the highest level to provide an input to the brake distribution control circuit 57. Thus, the high select circuit 55 supplies a brake command signal from the automatic auto-brake control circuit 54 to the brake distribution control circuit 57 in a condition where the driver performs no braking operation. When the driver has performed a braking operation, a signal from the stroke sensor $S_S$ or the pressure sensor $S_M$ is received into the brake distribution control circuit 57. For this reason, even if there is any defect in hydraulic pressure produced in the hydraulic pressure system connected to the master cylinder M, the braking operation can be reliably detected by the stroke sensor $S_S$ to assure the reliable supply of a signal corresponding to the amount of braking operation from the high select circuit 55 to the brake distribution control circuit 57.

The following detection values are received into a trouble diagnosis circuit 56: the detection value obtained in the left front wheel pressure sensor $S_{FL}$ for detecting the hydraulic pressure in the left hydraulic pressure system $L_L$; the detection value obtained in the right front wheel pressure sensor $S_{FR}$ for detecting the hydraulic pressure in the right hydraulic pressure system $L_R$; the detection value obtained in the rear wheel pressure sensor $S_R$ for detecting the hydraulic pressure in the collective hydraulic pressure system $L_T$; and the detection values obtained in the stroke sensor $S_S$ and the pressure sensor $S_M$ associated with the master cylinder M, and fail-signals from the subsidiary arithmetic processing sections $49_{FL}$, $49_{FR}$ and $49_R$ are also received into the trouble diagnosis circuit 56. When determination is made that the braking operation has been conducted on the basis of the signals from the stroke sensor $S_S$ and the pressure sensor $S_M$, it is judged whether or not a braking pressure is obtained by the detection values in the pressure sensors $S_{FL}$, $S_{FR}$ and $S_R$, thereby judging trouble, or it is judged whether or not the fail-signals from the subsidiary arithmetic processing sections $49_{FL}$, $49_{FR}$ and $49_R$ are received, thereby judging trouble. When the trouble has been decided, the third alarm 46 is operated. Moreover, when determination is made that the left front wheel electrically-operated hydraulic pressure producing means $A_{FL}$ in the left hydraulic pressure system $L_L$ is in trouble, the solenoid $36_L$ of the fail-safe solenoid switchover valve $27_L$ is deenergized by the trouble diagnosis circuit 56. On the other hand, when determination is made that the right front wheel electrically-operated hydraulic pressure producing means $A_{FR}$ in the right hydraulic pressure system $L_R$ is in trouble, the solenoid $36_R$ of the fail-safe solenoid switchover valve $27_R$ is deenergized by the trouble diagnosis circuit 56. This causes the first output port 2 in the master cylinder M and the left front wheel disk brake $B_{FL}$ in the left hydraulic pressure system $L_L$ to be put into communication with each other, and causes the second output port 3 in the master cylinder M and the right front wheel disk brake $B_{FR}$ in the right hydraulic pressure system $L_R$ to be put into communication with each other. Accordingly, even if both the front wheel electrically-operated hydraulic pressure producing means $A_{FL}$ and $A_{FR}$ get out of order, i.e., develop trouble, the hydraulic pressure can be assured by the master cylinder M which delivers the hydraulic pressure in response to the driver's operation.

Further, the trouble diagnosis circuit 56 is arranged to output a signal indicative of a command to switch over the deenergization and energization of the solenoids 41 and 42 of the shut-off valve 40 in response to an integration value of a difference between the detection values in the left and right wheel pressure sensors $S_{FL}$ and $S_{FR}$ exceeding a predetermined value, so that when the detection value in the left wheel pressure sensor $S_{FL}$ is large, the solenoid 42 is energized while leaving the solenoid 41 deenergized, and when the detection value in the right wheel pressure sensor $S_{FR}$ is large, the solenoid 41 is energized while leaving the solenoid 42 deenergized. This ensures that the shut-off valve 40 shuts off the transmission of the hydraulic pressure producing means $A_R$ to the left rear wheel disk brake $B_{RL}$, while maintaining the transmission of the hydraulic pressure from the rear wheel electrically-operated hydraulic pressure producing means $A_R$ to the right rear wheel disk brake $B_{RR}$ in the collective hydraulic pressure system $L_T$, when the hydraulic pressure in the left hydraulic pressure system $L_L$ becomes larger than that in the right hydraulic pressure system $L_R$, and the shut-off valve 40 shuts off the transmission of the hydraulic pressure from the rear wheel electrically-operated hydraulic pressure producing means $A_R$ to the right rear wheel disk brake $B_{RR}$, while maintaining the transmission of the hydraulic pressure from the rear wheel electrically-operated hydraulic pressure producing means $A_R$ to the left rear wheel disk brake $B_{RL}$ in the collective hydraulic pressure system $L_T$, when the hydraulic pressure in the right hydraulic pressure system $L_R$ becomes larger than that in the left hydraulic pressure system $L_L$.

The signal from the high select circuit 55 is received into the brake distribution control circuit 57, and signals applied to the solenoids $36_L$ and $36_R$ or the fail-safe solenoid switchover valves $27_L$ and $27_R$ from the trouble diagnosis circuit 56 are also received into the brake distribution control circuit 57. Thus, the brake distribution control circuit 57 outputs a signal corresponding to the braking pressure previously distributed so as to be applied to the left front wheel disk brake $B_{FL}$, the right front wheel disk brake $B_{FR}$ as well as the rear wheel disk brakes $B_{RL}$ and $B_{RR}$ in a switched manner between the cases where the left and right front wheel electrically-operated hydraulic pressure producing means $A_{FL}$ and $A_{FR}$ are normal and out of order, in response to reception of the signal indicative of a command to conduct the braking operation of a level corresponding to the amount of driver's braking operation, or the brake command signal delivered from the automatic brake control circuit 54 to conduct automatic braking in order to avoid collision of the subject vehicle against a vehicle in front during non-braking.

The output from the brake distribution control circuit 57 is applied to the correcting circuits $58_{FL}$, $58_{FR}$ and $58_R$. An antilock control signal from the antilock control circuit 52 is also received into the correcting circuits $58_{FL}$, $58_{FR}$ and $58_R$, and a signal corresponding to a braking pressure resulting from correction of the braking pressure distributed by the brake distribution circuit 57 in response to the signal from the antilock control circuit 52 is delivered from each of the correcting circuits $58_{FL}$, $58_{FR}$ and $58_R$.

Each of the subsidiary arithmetic processing sections $49_{FL}$, $49_{FR}$ and $49_R$ comprises a self-diagnosis circuit $84_{FL}$, $84_{FR}$, $84_R$ and a drive control circuit $85_{FL}$, $85_{FR}$, $85_R$ A signal is supplied into each of the self-diagnosis circuits $84_{FL}$, $85_{FR}$, $85_R$. A signal is supplied into each of the self-diagnosis circuits $84_{FL}$, $84_{FR}$ and $84_R$ from the corresponding pressure sensor $S_{FL}$, $S_{FR}$, $S_R$ and the corresponding correcting circuit $58_{FL}$, $58_{FR}$ $58_R$, and a signal is supplied into each of the drive control circuits $85_{FL}$, $85_{FR}$, $S_R$ from the corresponding pressure sensor $S_{FL}$, $S_{FR}$, $S_R$ and the corresponding correcting circuit $58_{FL}$, $58_{FR}$, $58_R$.

Each self-diagnosis circuit $84_{FL}$, $84_{FR}$, $84_R$ supplies a fail-signal to the trouble diagnosis circuit 56 on the basis of the decision of the fact that the electrically-operated hydraulic pressure producing means $A_{FL}$, $A_{FR}$, $A_R$ is out of order, i.e., in trouble, when the signal from the corresponding pressure sensor $S_{FL}$, $S_{FR}$, $S_R$ does not reach the predetermined value, notwithstanding that the signal indicative of the braking force has been received into the self-diagnosis circuit $84_{FL}$, $84_{FR}$, $84_R$ from the correcting circuit $58_{FL}$, $58_{FR}$, $58_R$.

Each drive control circuit $85_{FL}$, $85_{FR}$, $85_R$ delivers a signal indicative of a command to provide a PID control for the motor $9_{FL}$, $9_{FR}$, $9_R$ of the electrically-operated hydraulic pressure producing means $A_{FL}$, $A_{FR}$, $A_R$, so that the detection value in the corresponding pressure sensor $S_{FL}$, $SFR$, $S_R$ indicates a value corresponding to the signal received into each of the drive control circuits from the correcting circuit $58_{FL}$, $58_{FR}$, $58_R$.

The operation of the first embodiment will be described below. The distance L between the travelling subject vehicle and an obstruction such as a vehicle travelling in front thereof is detected by the distance detector 50 and supplied to the automatic brake control circuit 54 of the primary arithmetic processing section 48 in the electronic control unit 47. In the automatic brake control circuit 54, the first, second and third reference distances $L_{R1}$, $L_{R2}$ and $L_{R3}$ are calculated on the basis of such distance L and the vehicle speed $V_V$ obtained in the vehicle speed detecting circuit 51, and in accordance with the result of a comparison of these reference distances $L_{R1}$, $L_{R2}$ and $L_{R3}$ with the distance L, a signal is delivered to the first and second alarms 44 and 45 and the high select circuit 55. More specifically, the reference distances $L_{R1}$, $L_{R2}$ and $L_{R3}$ are calculated so that the relation $L_{R1} < L_{R2} < L_{R3}$ is established. When the distance L is less than the third reference distance $L_{R3}$, a signal indicative of a command to cause the second alarm 45 to perform a low level alarm operation is delivered from the automatic brake control circuit 54, in order to signal the driver for a braking operation for avoiding the collision of the subject vehicle against a vehicle in front and to previously notify the driver of the performance of the automatic braking operation, so that an unpredictable braking feeling is not imparted to the driver, when the automatic braking operation has been actually carried out. When the distance L is less than the second reference distance $L_{R2}$, a signal indicative of a command to cause the second alarm 45 to perform an alarming operation of a mean level and a signal indicative of a command to cause the first alarm 44 to perform an alarming operation of a low level, in order to notify a vehicle in rear of the start of an automatically braking operation to avoid the collision of the vehicle in rear against the subject vehicle are delivered from the automatic brake control circuit 54, and a signal indicative of a command to provide the pumping operation of the disk brake $B_{FL}$, $B_{FR}$, $B_{RL}$, $B_{RR}$ is applied to the high select circuit 55 from the automatic brake control circuit 54, and a signal indicative of a command to provide the pumping operation of the disk brake $B_{FL}$, $B_{FR}$, $B_{RL}$, $B_{RR}$ is applied to the high select circuit 55 from the automatic brake control circuit 54. Further, when the distance L is less than the third reference distance $L_{R3}$, signals indicative of a command to cause the first and second alarms 44 and 45 to perform alarming operations of a high level are delivered from the automatic brake control circuit 54, and a signal indicative of a command to provide a full operation of the disk brake $B_{FL}$, $B_{FR}$, $B_{RL}$, $B_{RR}$ is applied to the high select circuit 55 from the automatic brake control circuit 54.

In the execution of the automatic braking for avoiding the collision of the subject vehicle against the vehicle in front in this manner, the alarming to the driver and the alarming to the vehicle in rear are conducted sequentially in accordance with the distance between the subject vehicle and the vehicle in front. When the automatic breaking is carried out while notifying the diver of a danger to press the driver for the braking operation prior to the execution of the automatic braking, an unpredictable braking feeling is not imparted to the driver, and the vehicle in rear can be prevented from colliding against the subject vehicle during the automatic braking by pressing the vehicle in rear for reduction in speed. In the execution of the automatic braking, not that the full braking is conducted from the beginning, but the pumping braking, i.e., a moderate braking is first conducted and then, the full braking is conducted, resulting in a further reduced degree of unpredictable or impermissible braking feeling which may be imparted to the driver.

It should be noted that the equation represented by (1) for giving the reference distances $L_{R1}$, $L_{R2}$ and $L_{R3}$ includes a delay term $\{V_V \cdot (T_D + T_X)\}$ provided in consideration of a time $T_D$ from the start of the operation of the electrically-operated hydraulic pressure producing means $A_{FL}$, $A_{FR}$ and $A_R$ as well as the first and second alarms 44 and 45 in response to the signal output from the automatic brake control circuit 54, and a time $T_X$ required from the reception of the signal into the automatic brake control circuit 54 to the delivery of the signal therefrom, and it is possible to provide a more precise collision-preventing automatic brake control by including a delay time due to the control circuit itself into each reference distance $L_{R1}$, $L_{R2}$, $L_{R3}$ which is a reference value for avoiding the collision.

In the execution of the pumping braking, when the friction coefficient $\mu$ of a travel road surface becomes equal to or less than the set value $\mu_0$, there is a possibility that the set deceleration at the time when the reference distance is calculated cannot be exhibited and therefore, a braking depending upon the conditions of the travel road surface is made possible by switchover from the pumping braking to the full braking. It should be noted that when at least one of wheels $W_{FL}$, $W_{FR}$, $W_{RL}$ and $W_{RR}$ is about to become locked during switchover from the pumping braking to the full braking, the output hydraulic pressure from one of the electrically-operated hydraulic pressure producing means $A_{FL}$, $A_{FR}$ and $A_R$ which corresponds to the wheel about to become locked is controlled in response to the output signal from the antilock control circuit 52 and thus, the locking of the wheel cannot occur.

In addition to the automatic brake control for avoiding the collision, the operation of each electrically-operated hydraulic pressure producing means $A_{FL}$, $A_{FR}$, $A_R$ is controlled in accordance with the braking pressure set in the brake distribution control circuit 57 during a braking operation provided by depression of the brake pedal 26 by the driver, and in response hither to, a braking force is provided in each disk brake $B_{FL}$, $B_{FR}$, $B_{RL}$, $B_{RR}$.

Moreover, when the hydraulic pressures in the left and right hydraulic pressure systems $L_L$ and $L_R$ are different from each other despite during the automatic braking for avoiding the collision and during the braking operation provided by the driver, the transmission of the hydraulic pressure from the rear wheel electrically-operated hydraulic pressure producing means $A_R$ to the left and right brakes $B_{RL}$ and $B_{RR}$ in the collective hydraulic pressure system $L_T$ and the cut-off of such transmission are switched over from one to the other by controlling the energization and deenergization of the solenoids 41 and 42 by the trouble diagnosis circuit 56. More specifically, when the hydraulic pressure in the left hydraulic pressure system $L_L$ is larger than that in the right hydraulic pressure system $L_R$, the solenoid 41 is deenergized and the solenoid 42 is energized by the trouble diagnosis circuit 56, thereby causing the shut-off valve 40 to cut off the transmission of the hydraulic pressure from the rear wheel electrically-operated hydraulic pressure producing means $A_R$ to the left rear wheel disk brake $B_{RL}$, while maintaining the transmission of the hydraulic pressure from the rear wheel electrically-operated hydraulic pressure producing means $A_R$ to the right rear wheel disk brake $B_{RR}$. When the hydraulic pressure in the right hydraulic pressure system $L_R$ is larger than that in the left hydraulic pressure system $L_L$, the solenoid 42 is deenergized and the solenoid 41 is energized by the trouble diagnosis circuit 56, thereby causing the shut-off valve 40 to cut off the transmission of the hydraulic pressure from the rear wheel electrically-operated hydraulic pressure producing means $A_R$ to the left rear wheel disk brake $B_{RL}$, while maintaining the transmission of the hydraulic pressure from the rear wheel electrically-operated hydraulic pressure producing means $A_R$ to the right rear wheel disk brake $B_{RR}$. By cutting off the transmission of the hydraulic pressure to one of the left and right brakes $B_{RL}$ and $B_{RR}$ in the collective hydraulic pressure system $L_T$ which is of the same side as one of the left and right hydraulic pressure systems $L_L$ and $L_R$ which is of a high pressure in this manner, even if a difference in hydraulic pressure is produced between the left and right hydraulic pressure systems $L_L$ and $L_R$, any unbalance between left and right braking forces in the entire vehicle can be eliminated, and any yaw motion can be prevented from occurring in the vehicle without use of a driver's steering operation.

Moreover, since the trouble diagnosis circuit 56 is arranged to output the signal indicative of the command to switchover the deenergization and energization of the solenoids 41 and 42 on the basis of the integration value of the difference between the detection values in the left and right front wheel pressure sensors $S_{FL}$ and $S_{FR}$ and perform the control with the lapse of time taken into consideration, the drive signal is not outputted even if a condition is reached in which the braking forces are different between the left and right hydraulic pressure system $L_L$ and $L_R$ during an antilock brake control and a traction control, and the energization and deenergization of the solenoids 41 and 42 can be frequently switched over from one to the other to prevent the occurrence of a hunting of the control.

Figure 6:
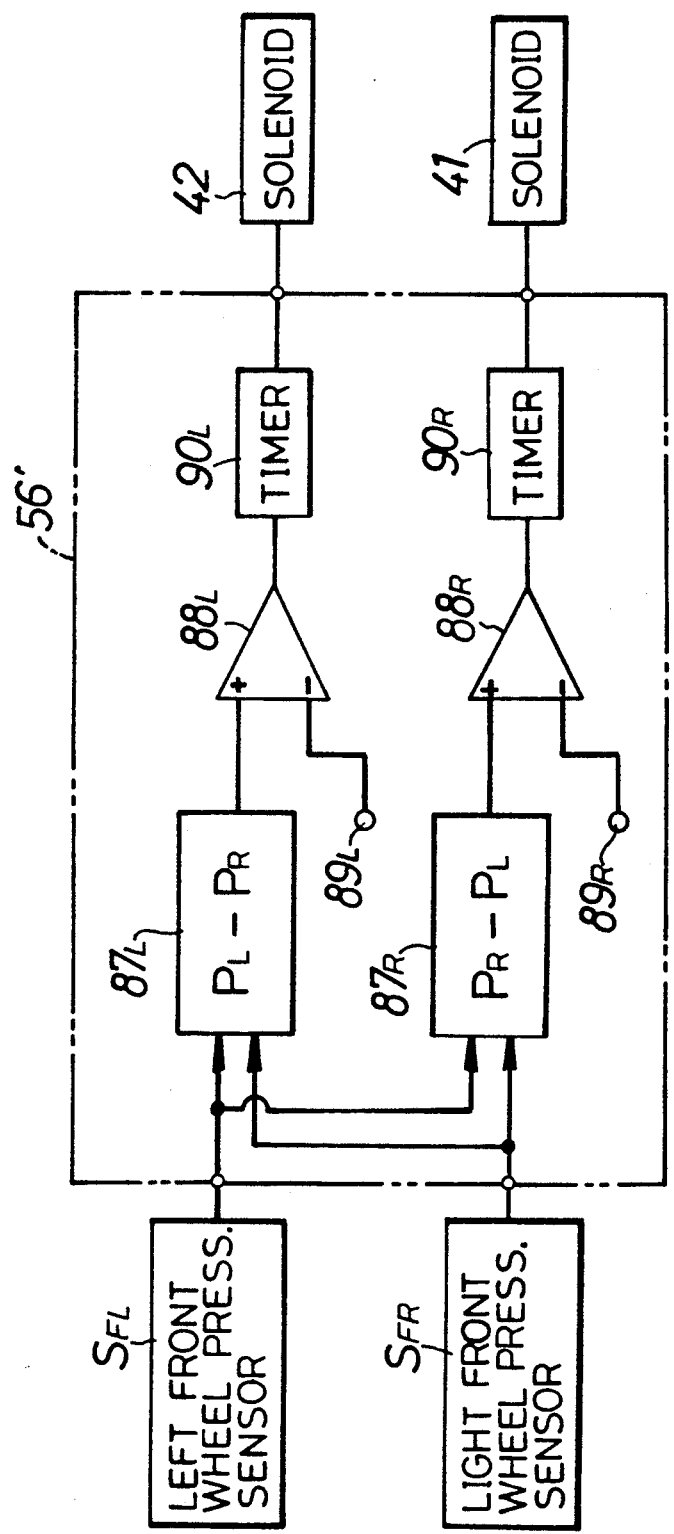

FIG. 6 illustrates a modification of an essential portion of the trouble diagnosis circuit. In a trouble diagnosis circuit 56', a section or controlling the energization and deenergization of the solenoids 41 and 42 comprises calculation circuits $87_L$ and $87_R$ for calculating a difference between detection pressures $P_L$ and $P_R$ detected by the left and right front wheel pressure sensors $S_{FL}$ and $S_{FR}$, comparators $88_L$ and $87_R$ each adapted to output a signal in response to the difference between detection pressures $P_L$ and $P_R$ exceeding a reference value received from reference terminations $89_L$ and $89_R$, and timers $90_L$ and $90_R$ each adapted to output a signal indicative of a command to energize the solenoids 41 and 42 in response to the output signal from the comparator $88_L$, $87_R$ being sustained beyond a set time.

Even with such arrangement, the energization and deenergization of the solenoids 41 and 42 can be frequently switched over from one to the other by taking a lapse of time into consideration, thereby preventing the occurrence of a hunting of the control.

Figure 7:
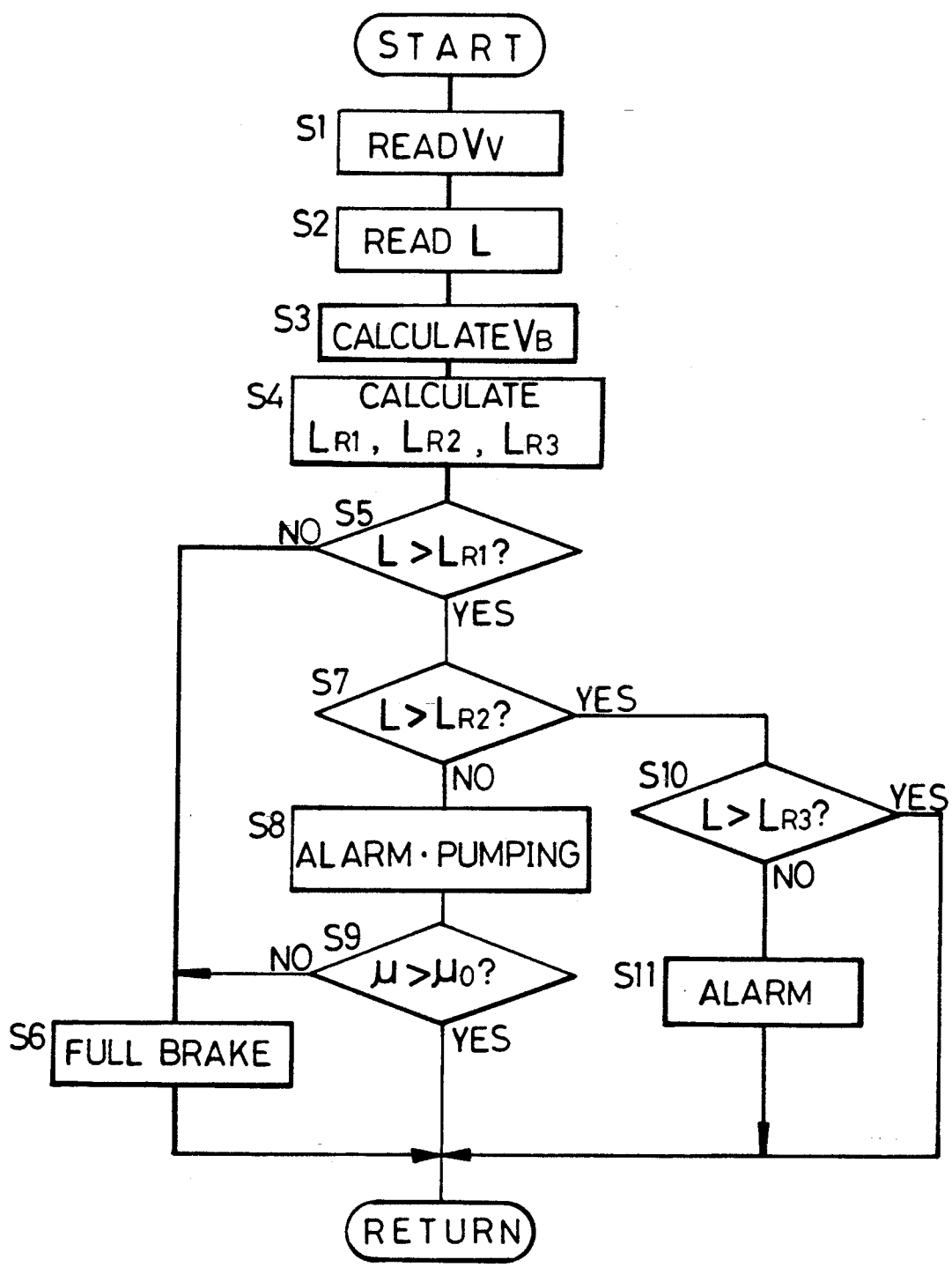

The automatic brake control circuit 54 in the above-described embodiment may be a computer which performs a control procedure according to a previously established program. FIG. 7 illustrates such a control procedure.

Referring to FIG. 7, a vehicle speed $V_V$ is read at a first step S1, and a distance L obtained in the distance detector 50 is read at a second step S2. A travel speed $V_B$ of a vehicle travelling in front of the subject vehicle is calculated at a third step S3. Further, first, second and third reference distances $L_{R1}$, $L_{R2}$ and $L_{R3}$ are calculated at a fourth step S4.

At a fifth step S5, it is judged whether or not the distance L exceeds the first reference distance $L_{R1}$ ($L > L_{R1}$). If $L \leq L_{R1}$, the signal indicative of a command to preform the full brake is delivered at a sixth step S6. If $L > L_{R1}$, the processing is advanced to a step S7 at which it is judged whether or not the distance L exceeds the second reference distance $L_{R2}$ ($L > L_{R2}$). If $L \leq L_{R2}$, the processing is advanced to an eighth step S8, and if $L > L_{R2}$, the processing is advanced to a tenth step S10.

At the eighth step S8, the first alarm 44 is operated for alarming, and an intermittent high level signal indicative of a command to perform the pumping brake is delivered from the pumping signal output device 75. At a ninth step S9, it is judged whether or not the friction coefficient $\mu$ of a travel road surface exceeds the friction coefficient $\mu_0$ of road surface, e.g., 0.4. If it has been determined that $\mu \leq \mu_0$, the processing is advanced to the sixth step S6 at which the signal indicative of a command to perform the full brake is delivered.

At the tenth step S10, it is judged whether or not the distance L exceeds the third reference distance $L_{R3}$ (L $L_{R3}$) If the $L \leq L_{R3}$, the signal indicative of a command to operate the second alarm 45 for alarming is delivered at an eleventh step S11. In this manner the possibility of collision of the subject vehicle against the vehicle travelling in front is determined by sequentially performing the comparison of the distance L with the first reference distance $L_{R1}$ which is the smallest value, the comparison of the distance L with the second reference distance $L_{R2}$ which is larger in value than the first reference distance $L_{R1}$, and the comparison of the distance L with the third reference $L_{R3}$ which is the largest value. By conducing these comparisons in this order, i.e., the order from the comparison in which the possibility of collision is highest to the comparison in which such possibility is lower, any unnecessary calculation can be omitted, thereby enhancing the calculation efficiency.

Figure 8:
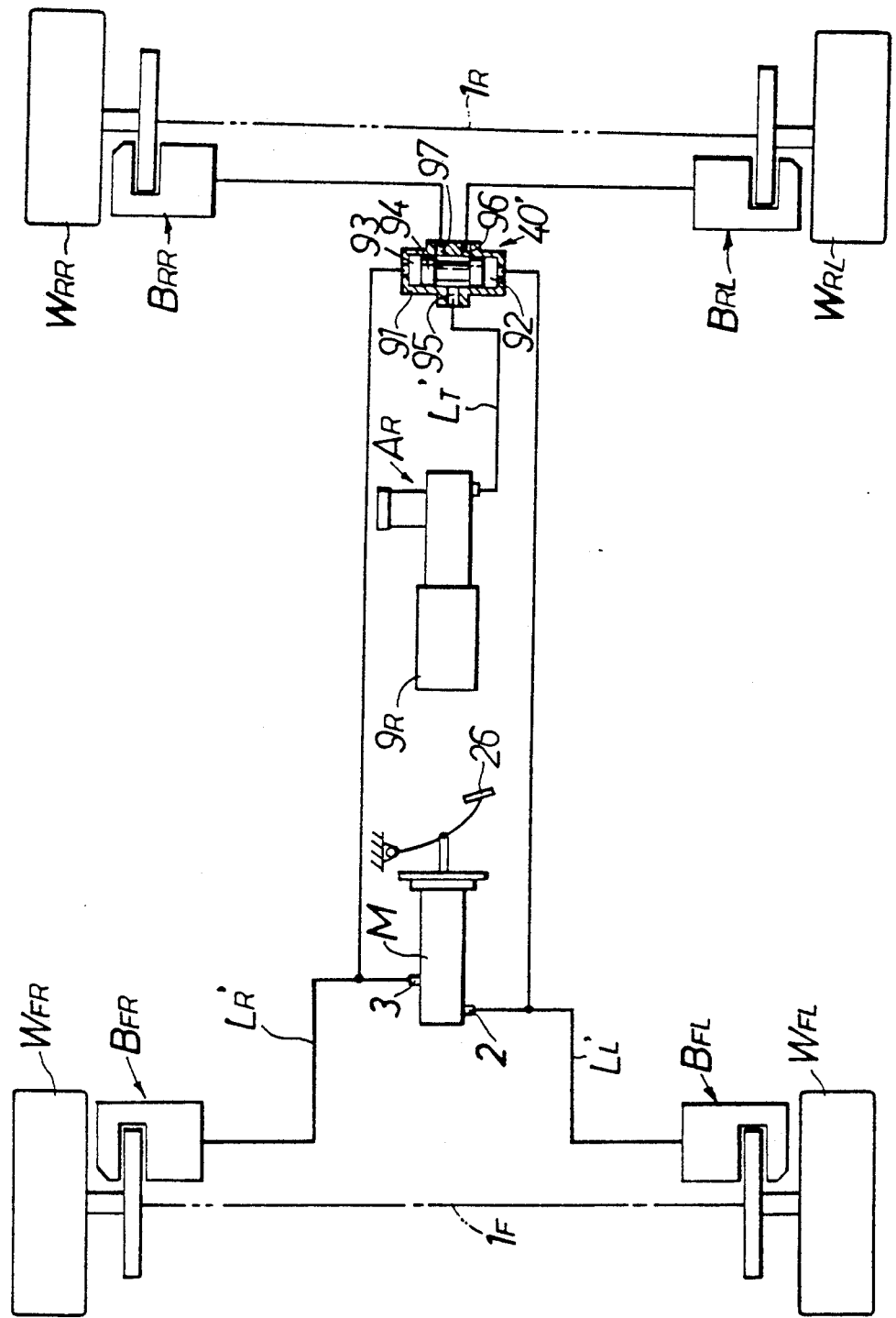
FIG. 8 is a diagram of a braking hydraulic pressure system in a vehicle according to a second embodiment of the present invention.

FIG. 8 illustrates a second embodiment of the present invention, in which a left hydraulic pressure system $L_L'$ is comprised of a tandem type master cylinder M connected at its first output port 2 to the left front wheel disk brake $B_{FL}$ A right hydraulic pressure system $L_R'$ is comprised of the tandem type master cylinder M connected at its second output port 3 to the right front wheel disk brake $B_{FR}$, and a collective hydraulic pressure system $L_T'$ is comprised of rear wheel electrically-operated hydraulic pressure producing means $A_R$ connected to the left and rear wheel disk brakes $B_{RL}$ and $B_{RR}$.

A shut-off valve 40' is provided in the collective hydraulic pressure system $L_T'$ and comprises a cylindrical housing 91 closed at its axially opposite ends, and a spool 94 as a slide member, which slidably received in housing 91 to define, between the spool and the opposite ends of the housing 91, pressure chambers 92 and 93 independently leading to the left and right hydraulic pressure systems $L_L'$ and $L_R'$, respectively, The housing 91 is provided with an input port 95 leading to the rear wheel electrically-operated hydraulic pressure producing means $A_R$, a first output port 96 leading to the left rear wheel disk brake $B_{RL}$, and a second output port 97 leading to the right rear wheel disk brake $B_{RR}$. The spool 94 is movable among a neutral position in which the input port 95 is permitted to be put into communication with the first and second output ports 96 and 97, when the pressures in the pressure chambers 92 and 93 are equal, a position in which the input port 95 is permitted to be put out of communication with the first output port 96, while being maintained in communication with the second output port 97, when the pressure in the pressure chamber 92 is larger than that in the pressure chamber 93 by a predetermined value or more, a position in which the input port 95 is permitted to be put out of communication with the second output port 97, while being maintained in communication with the first output port 96, when the pressure in the pressure chamber 93 is larger than that in the pressure chamber 92 by a predetermined value or more.

With the shut-off valve 40', the need for a complicated control circuit is eliminated. Further, when a hydraulic pressure in one of the left and right hydraulic pressure systems $L_L'$ and $L_R'$ exceeds that of the other system by the predetermined value, it is possible to cut off the transmission of a hydraulic pressure to one of the left and right brakes $B_{RL}$ and $B_{RR}$ which is on the same side as said one of the left and right hydraulic pressure systems $L_L'$ and $L_R'$ which is at a higher pressure, thereby automatically avoiding the occurrence of an unbalance in braking force at the left and right sides of the vehicle during braking.

In the above-described embodiments, a laser radar for detecting the distance from the subject vehicle to an obstruction such as a vehicle in front has been employed as the detector 50, but it will be understood that information such as braking operation may be received from a vehicle in front to detect an operational parameter between both the vehicles.

In addition, although each of the brakes $B_{FL}$, $B_{FR}$, $B_{RL}$ and $B_{RR}$ is continuously operated by the high level changing-signal delivered from the AND gate 71 as the changing-signal outputting circuit and in the above-described embodiments, it will be also understood that when the road surface friction coefficient $\mu$ has become equal to or less than the predetermined value $\mu_0$ during pumping braking, the reference distances $L_{R1}$ and $L_{R2}$ in the first and second reference distance calculators 61 and 62 may be changed to a longer level to change the requirements for delivery of the brake control signal, so that a braking force corresponding to a road surface of a low friction coefficient can be achieved.

What is claimed is:

1. A collision preventing system for a vehicle, including a parameter detector for detecting an operational parameter between a vehicle and a contrast obstruction for judging a possibility of collision of the vehicle against the contrast obstruction, one or more brakes being operated on the basis of a detection value detected by the parameter detector, said system comprising:

a road surface friction coefficient judgement circuit for judging a friction coefficient of a travel road surface on the basis of a detection value detected by a wheel speed detector which detects a speed of each of a plurality of wheels, and for outputting a judgement signal, when determination is made that the friction coefficient is equal to or less than a predetermined value;

a first comparator for comparing the detection value of said parameter detector with a first reference value indicative of a possibility of collision of the vehicle against the contrast obstruction being high, and for outputting, on the basis of the result of such comparison, a first brake control signal indicative of a command to continuously operate each said brake;

a second comparator for comparing the detection value of said parameter detector with a second reference value indicative of a possibility of said collision lower than that in the case of the first reference value, and for outputting, on the basis of the result of such second comparison, a second brake control signal indicative of a command to perform a pumping operation for each said brake; and a changing-signal output circuit for outputting a changing-signal indicative of a command to change an operation control mode for each brake in response to the judgement signal outputted from said road surface friction coefficient judgement circuit in a condition in which the second brake control signal is outputted from the second comparator.

2. A collision preventing system for vehicles according to claim 1, wherein said road surface friction coefficient judging circuit is arranged to determine that the friction coefficient of the travel road surface becomes equal to or less than the predetermined value, when at least one of the plurality of wheel speeds becomes equal to or less than a reference wheel speed provided by taking account of a predetermined slip rate into a vehicle speed which is estimated on the basis of the plurality of wheel speeds.

3. A collision preventing system for vehicles according to claim 1, wherein the changing-signal outputted from said changing-signal output circuit is a signal indicative of a command to continuously operate each said brake.

* * * * *